Jan. 2, 1968 D. L. HINGS 3,361,957
TELLURIC CURRENT RESPONSIVE DEVICE HAVING SPACED CONDUCTORS
FOR POSITIONING ADJACENT THE EARTH'S SURFACE
Filed Jan. 23, 1962 12 Sheets-Sheet 1

INVENTOR.
DONALD L. HINGS
BY Woodling, Krost,
Shanger and Rust
ATTORNEYS

INVENTOR.
DONALD L. HINGS
BY Woodling, Krost,
Granger and Rust
ATTORNEYS

Jan. 2, 1968  D. L. HINGS  3,361,957
TELLURIC CURRENT RESPONSIVE DEVICE HAVING SPACED CONDUCTORS
FOR POSITIONING ADJACENT THE EARTH'S SURFACE
Filed Jan. 23, 1962  12 Sheets-Sheet 5

INVENTOR.
DONALD L. HINGS
BY Woodling, Krost,
Granger and Rust
ATTORNEYS

Jan. 2, 1968                 D. L. HINGS                 3,361,957
TELLURIC CURRENT RESPONSIVE DEVICE HAVING SPACED CONDUCTORS
FOR POSITIONING ADJACENT THE EARTH'S SURFACE
Filed Jan. 23, 1962                                                 12 Sheets-Sheet 6

INVENTOR.
DONALD L. HINGS
BY *Woodling, Krost,*
*Granger and Rust*
ATTORNEYS

Jan. 2, 1968  D. L. HINGS  3,361,957
TELLURIC CURRENT RESPONSIVE DEVICE HAVING SPACED CONDUCTORS
FOR POSITIONING ADJACENT THE EARTH'S SURFACE
Filed Jan. 23, 1962  12 Sheets—Sheet 7

INVENTOR.
DONALD L. HINGS
BY Woodling, Krost,
Granger and Rust,
ATTORNEYS

Jan. 2, 1968 D. L. HINGS 3,361,957
TELLURIC CURRENT RESPONSIVE DEVICE HAVING SPACED CONDUCTORS
FOR POSITIONING ADJACENT THE EARTH'S SURFACE
Filed Jan. 23, 1962 12 Sheets-Sheet 8

INVENTOR.
DONALD L. HINGS
BY Woodling, Krost, Granger and Rust
ATTORNEYS

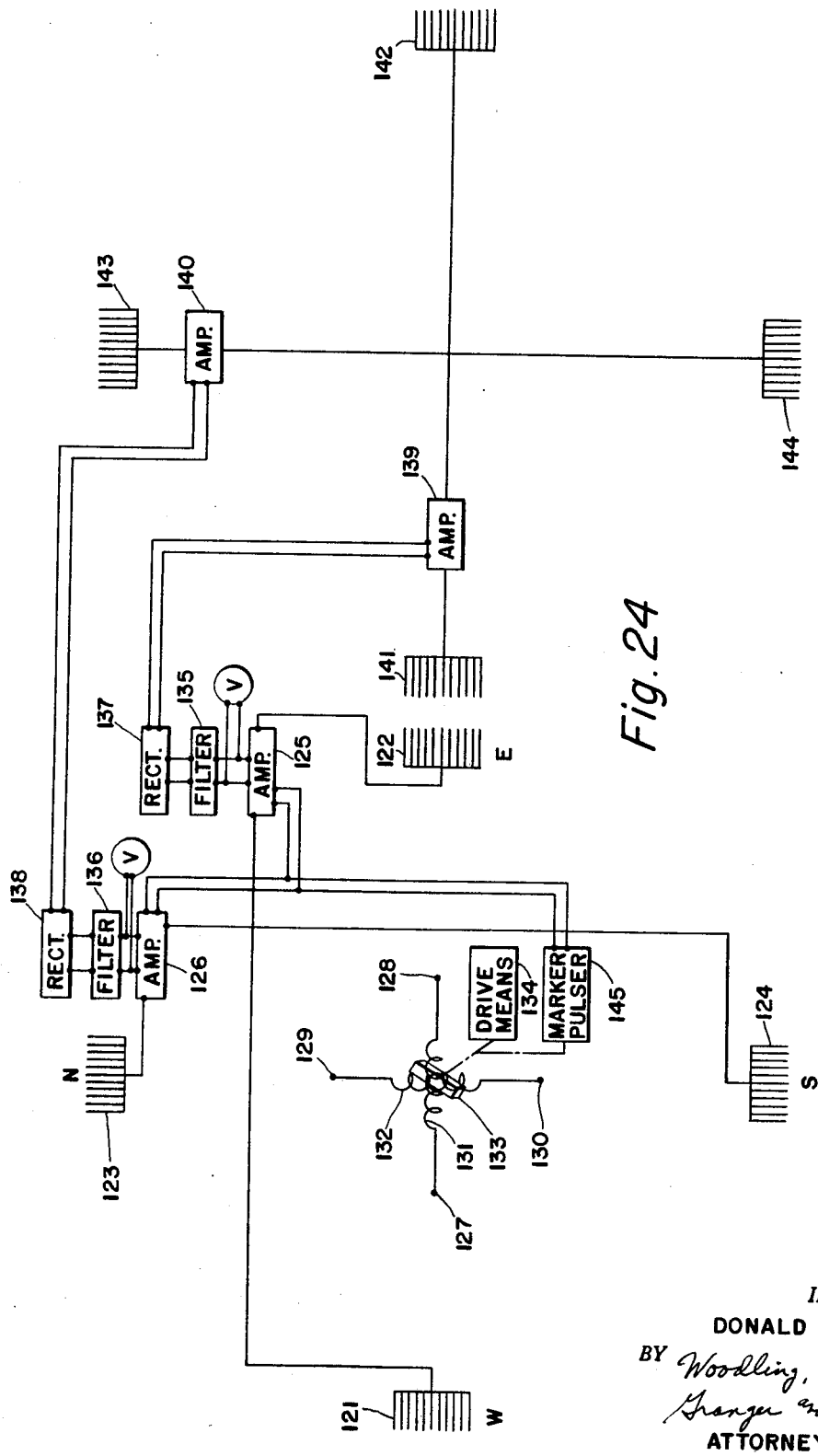

INVENTOR.
DONALD L. HINGS
BY Woodling, Krost, Granger and Rust
ATTORNEYS

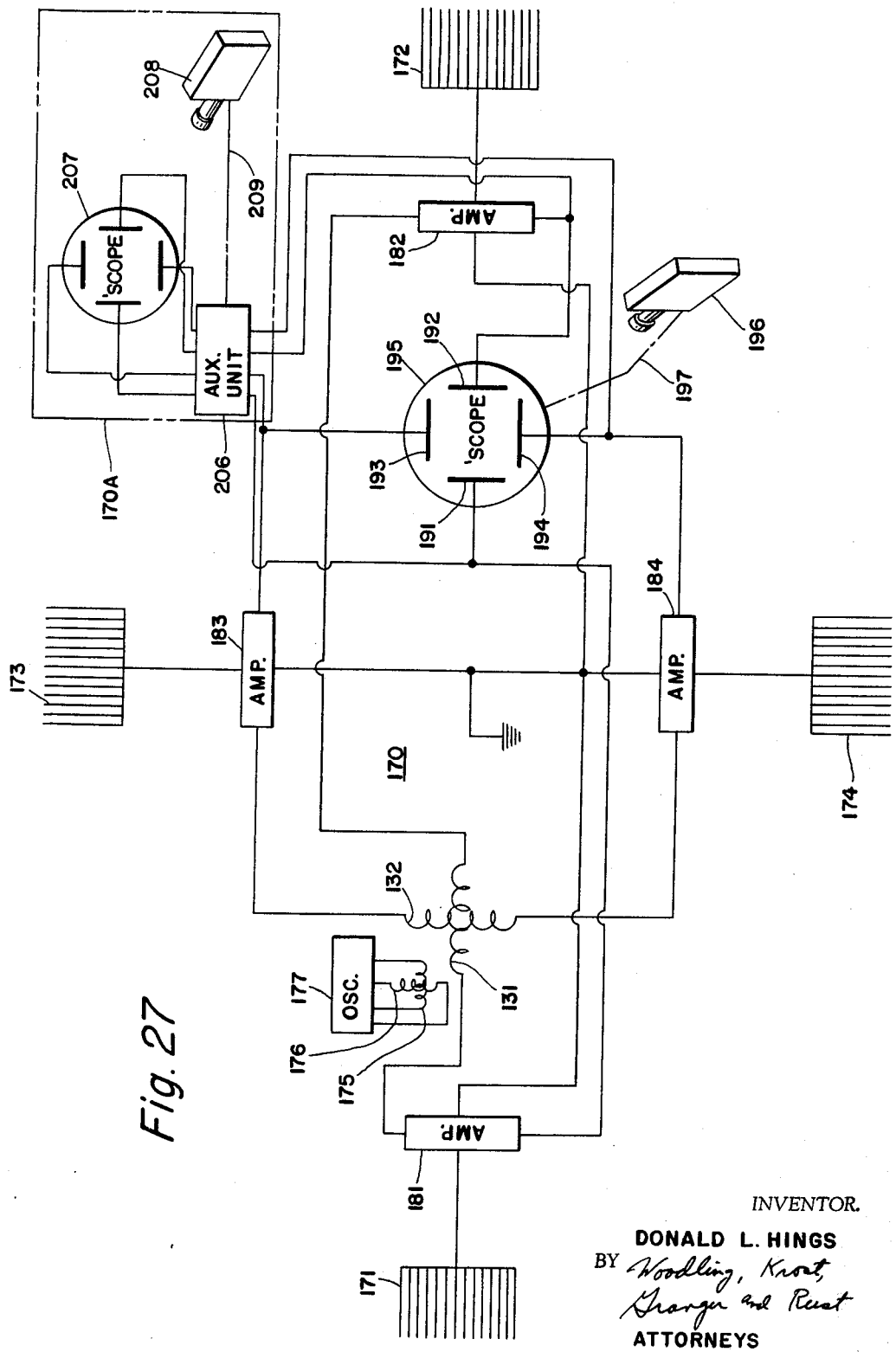

INVENTOR.
DONALD L. HINGS
BY Woodling, Krost, Granger and Rust
ATTORNEYS

United States Patent Office 3,361,957
Patented Jan. 2, 1968

3,361,957
TELLURIC CURRENT RESPONSIVE DEVICE HAVING SPACED CONDUCTORS FOR POSITIONING ADJACENT THE EARTH'S SURFACE
Donald L. Hings, 281 N. Howard Ave., Vancouver, British Columbia, Canada
Filed Jan. 23, 1962, Ser. No. 168,219
20 Claims. (Cl. 324—1)

This application is a continuation-in-part of application Ser. No. 124,628, filed July 17, 1961, for Electrical Pickup, now abandoned.

The invention relates in general to telluric transducers and, more particularly, to a device or system which will transfer energy between the telluric currents of the earth and some other form of electromagnetic wave energy. Such transducer may be used as an electrical voltage pickup device to obtain a voltage responsive to the telluric currents of the earth.

These currents are known to have diurnal characteristics wherein the general direction of flow is towards the sun. For the purposes of determining the characteristics of substrata, it is known that these currents will follow along the paths of least resistance. With the knowledge of the diurnal directivity of the currents, the surface potential measurements will determine any nonuniformities that would indicate variations in the substrata structure and conductivity.

It has been the practice to bury electrodes below the surface of the ground in suitable arrangements and connections to galvanometers so that a multiplicity of measurements would determine the strength and direction of the earth's currents with respect to time.

The invention herein referred to eliminates the requirement of making fixed conductive contact with the surface of the earth. The invention permits the direction and the amplitude of the earth's currents to be instrumented at one location without the aid of extended wires to grounded electrodes. The invention utilizes the natural potentials or voltages that exist on the surface of the earth or in the immediate atmosphere above the surface of the earth to thereby correlate the currents that flow along the conductive surface of the earth.

It is found that when two conducting grids or mats that have an open circuit with low distributed capacity parallel to their surface are spaced and supported within an inch of the surface of the earth, a direct current potential difference in the order of millivolts will exist between the grids or mats. The potential difference is greatest when the mat is pressed to the ground with insulation between the mat and ground. The potential difference is reduced with the increased spacing or increasing elevation of the mat above the ground and a point of neutral or zero potential usually exists within the first twelve inches above the ground. This voltage gradient to zero potential inverts as the mat is raised above the neutral point, thus producing an opposite polarity potential with increased height.

When two insulated conductive mats are horizontally spaced on the earth's surface, a difference of potential will exist on the mats that is proportional to the horizontal distribution of the earth's natural current.

Accordingly, an object of the invention is to provide an electrical device including first and second conductor means positioned generally along an axis with first ends of each conductor means positioned closer together along the axis than the second ends of the conductor means, means to insulate the conductor means from ground and to space a majority of the total effective conductor length of the conductor means within the lower atmosphere exchange layer and within the influence of telluric current flow in the earth to develop a direct current potential difference between the conductor means, a load, and means to connect the load to the first ends of the conductor means.

It is the object of the invention to measure the earth's potentials in the lower atmosphere exchange layer immediately adjacent to the earth's surface.

It is an object of the invention to include means for measuring the gradient potential in a vertical plane.

It is an object of the invention to scan and measure the horizontal gradient through 360° of the earth's potential at a predetermined horizontal spacing above the surface of the earth.

It is an object of the invention to provide instrumentation means including a multiplicity of two or more high impedance elements, a microvoltmeter and controls to determine the orientation of the earth's potentials.

It is an object of the invention that the instrumentation for measurement of the earth's potential shall be suitable for operation by resting the instrument directly upon the ground.

Another object of the invention is that a secondary means is provided to determine the relative effectiveness of the coupling to the earth's surface irrespective of the earth's potential measurements.

Another object of the invention is to provide a means for measurements of the earth's surface potentials wherein a vehicle having no electrical connections with the earth may house the instrumentation for direct and continuous measurement of the earth's potentials. This would apply to motor vehicles, helicopters and surface vessels.

Another object of the invention is to render possible of detection and measurable, the earth's surface potentials over water wherein the mats or grid elements are insulated from contact with the water and are made buoyant to float upon the surface of the water to thereby indicate the distribution and variations of the earth's potentials respective to the measurements between two or more mats.

Another object of the invention is that readings may be taken with equipment in suitable vehicles or vessels while on the move by skimming the mats or grids across the surface of the earth or water with the mats, wires or multiplicity of cables suitably arranged for trailing at predetermined spacing for the measurement of the earth's potentials.

Another object of my invention is to utilize a segmented insulated radial mat wherein the conductive areas within a circular mat are equivalent to the positioning of the spokes in a wheel and extend from a hub. A fixed commutator with the switching segments connected to the mat segments forming the circle, and rotatable contact means to thereby measure the surface voltage in arcs in sequence through 360° between the opposite conductive areas.

Another object of the invention is to form in combination with a recorder a means for producing a polar chart automatically and directly from the earth's potential pattern throughout 360°.

Another object of the invention is to provide a telluric voltage pickup device wherein means is provided responsive to the telluric current flow, and which means may be a voltmeter, any load, responsive equipment, or a means of transducing and storing the information for later transcribing.

Another object of the invention is to provide a telluric voltage pickup system with a means to impress an A.C., D.C. or pulsating voltage into the system to provide, in addition to the telluric current, an earth current influencing the total voltage pickup, hence providing means to receive intelligence by man-made influence on the telluric currents.

Another object of the invention is to provide a quadrature arrangement of electrical conductor means for picking up a voltage responsive to the telluric current and also providing a quadrature arrangement of two coils into which is induced an alternating voltage, with these quadrature-in-phase voltages also applied to the system.

Another object of the invention is to provide a telluric voltage pickup system with a calibration voltage passed through the terrain to be received on the voltage pickup device with the calibration voltage being a periodically variable voltage and affording continuous calibration for the telluric current measurements received on telluric voltage pickup devices.

Still another object of the invention is to provide an automatic gain control for use with telluric voltage pickup devices.

Another object of the invention is to provide an ionization path to bypass telluric currents from the earth with means responsive to the bypassed currents.

Another object of the invention is to provide a means responsive to atmospheric disturbances which affect the telluric currents of the earth.

Still another object of the invention is to provide a telluric transducer to effect a transfer of energy between the telluric currents of the earth and some other form of electromagnetic wave energy.

Other objects and a fuller understanding of the invention may be had by referring to the following description and claims, taken in conjunction with the accompanying drawings, in which:

FIGURES 24 and 25 are schematic diagrams of two telluric voltage pickup systems;

FIGURE 27 is a schematic diagram of another modification;

Figure 1:
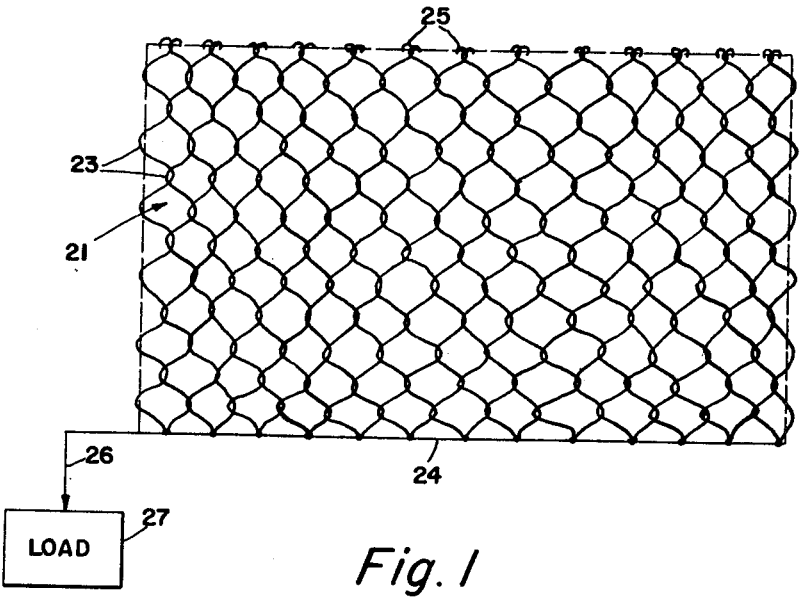
FIGURE 1 is a plan view of one type of conductor means usable with the invention.

The figures of the drawing show various embodiments of the invention to achieve a voltage pickup of the earth's potential directly related to the earth's current flowing in the surface of the earth. These currents are often called telluric currents.

FIGURE 1 illustrates surface electrode means, a conductive mat or conductor means 21 having interwoven insulated wires or conductors 23, electrically closed and connected at a first end 24 and electrically open at a second end 25. The interconnected first ends 24 are connected by a lead 26 to a load such as a meter or measuring indicator 27.

Figure 2:
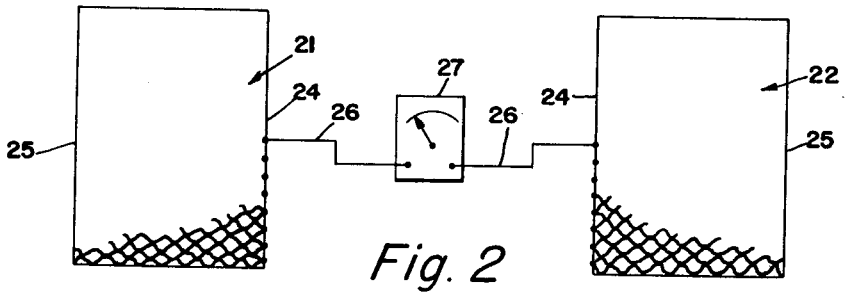
FIGURE 2 is a plan view of two such conductor means connected to a voltmeter.
Figure 3:
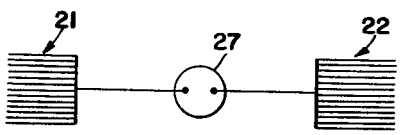
FIGURE 3 is a schematic diagram of the apparatus of FIGURE 2.

FIGURE 2 illustrates the simplified circuit arrangement wherein two mats 21 and 22 are placed with the electrically closed ends 24 nearest each other and the electrically open ends 25 placed in the direction in which the opposite potential is to be measured. FIGURE 3 shows the schematic arrangement of the apparatus of FIGURE 2.

FIGURE 2 illustrates, basically, the fundamental arrangement of the apparatus wherein two conductive mats 21 and 22 are used. These conductive mats 21 and 22 may be considered as first and second conductor means each having a plurality of conductors 23 which extend generally in the same direction, namely, from the first end 24 to the second end 25. The two conductor means 21 and 22 are disposed generally along a lengthwise axis with the individual conductors 23 also extending generally parallel to this axis. Since the telluric currents flow generally in an east-west path, the greatest voltage pickup is obtained when this axis is disposed east and west. The wires 23 are individually insulated and this insulates them from ground when these mats are placed on the ground and, under these conditions, the greatest voltage pickup is accomplished which will be indicated on the meter or measuring device 27. Such meter may be considered as a load for the conductive mats which, together, form the voltage pickup device of the invention.

Figure 4:
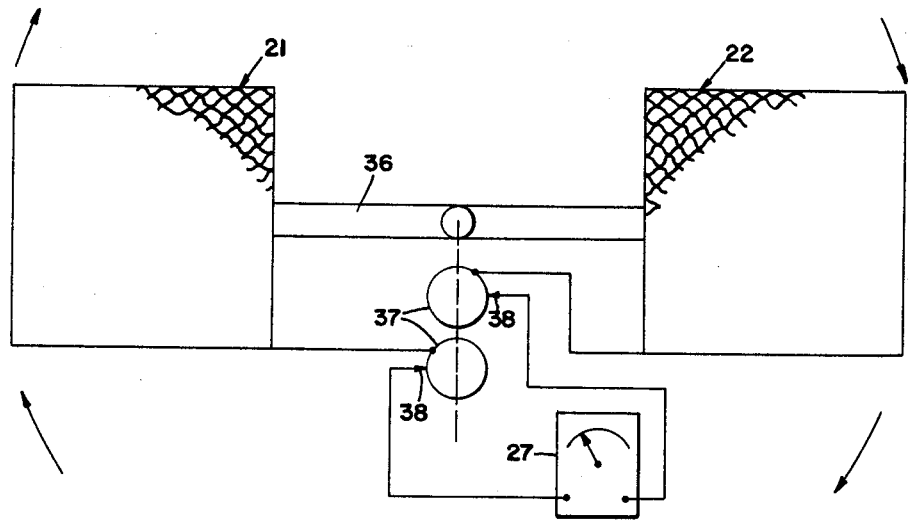
FIGURE 4 is a modification utilizing rotatable conductor means.

FIGURE 4 shows an arrangement for two mats 21 and 22 mounted on a rotatable arm 36. Two slip rings 37 are mounted rotatable with the rotatable arm and are connected to the individual mats 21 and 22. Sliding contacts or brushes 38 connect the mats to the meter 27. With the mats mounted closely to the ground and rotated slowly, the meter 27 will indicate the direction of the earth's potentials, such as maximum or minimum voltages, within a very few degrees.

Figure 5:
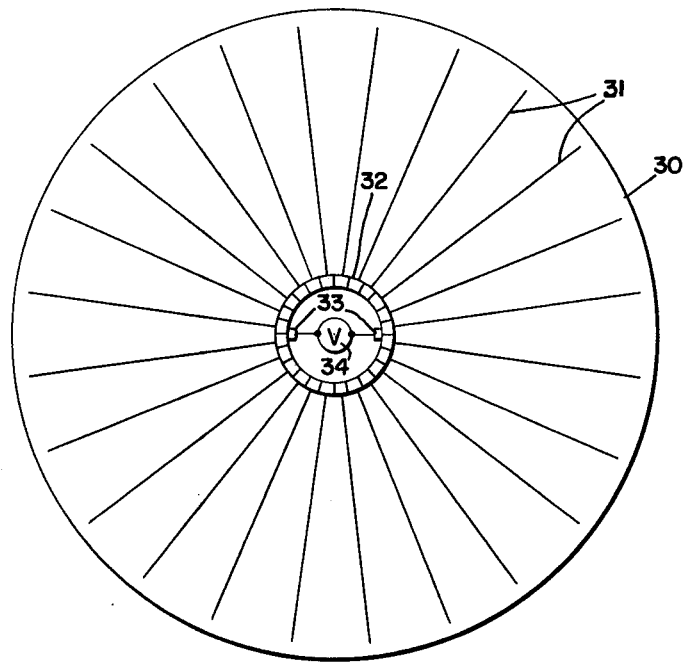
FIGURE 5 is another modification utilizing a plurality of radial conductors.

FIGURE 5 is a plan view of a circular segmented mat arrangement 30 for determining the direction in which the earth currents are flowing. The mat 30 has a plurality of generally radially disposed conductors 31, each having an inner end or first end connected to a different segment of a commutator 32. The outer or second end of each of these conductors 31 is open circuited. Preferably, each of the outboard ends of the conductors 31 is terminated in a plurality of outwardly extending fingers 35. The conductors may be imbedded or otherwise mounted on the mat 30 in an insulated manner, for example, they may be imbedded in or fastened on a rubber mat. More than one conductor may be connected to each commutator segment if this is desired; however, only a single conductor is shown connected to each commutator segment. Opposite sliding contacts or brushes 33 engage the commutator 32 and are connected to a measuring device shown as a voltmeter 34. The mat 30 may be placed in a stationary position on the surface of the earth and the sliding brushes 33 rotated around the commutator 32 to thereby sample successively between two opposite mat segments or conductors 31. This will indicate the direction of the earth's potentials and, hence, the earth's current. The brushes 33 may be constructed for variable effective width, if desired, as described hereinafter in connection with FIGURE 19. This will permit contact with more than one commutator segment for greater voltage pickup. If a recording voltmeter is used, a record of such earth's potential will be obtained, such as on a polar chart.

Figure 6:
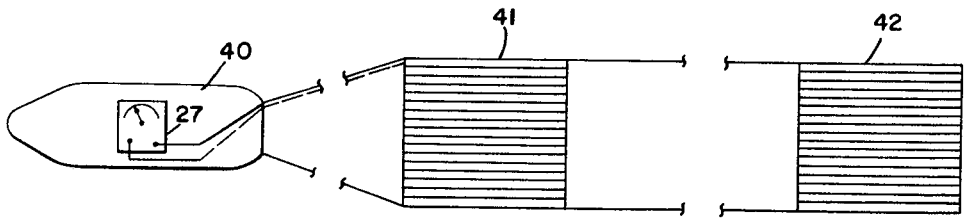
FIGURE 6 is another modification for use with surface vessels.

FIGURE 6 indicates two mats 41 and 42 being towed by a vessel such as a small boat 40. The mats or conductor means 41 and 42 are connected as shown in FIGURE 3 with the connecting leads to the meter 27 paralleling the tow cables to thereby detect the potentials in the direction of travel of the vessel. The conductor means 41 and 42 are again constructed of insulated plural conductors, electrically connected at the proximate ends of the mats.

Figure 7:
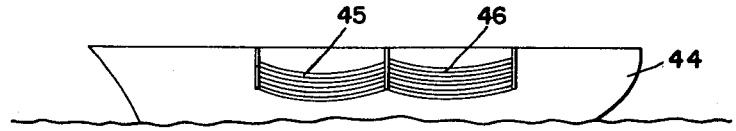
FIGURE 7 is a side elevation of a vessel employing another modification.
Figure 8:
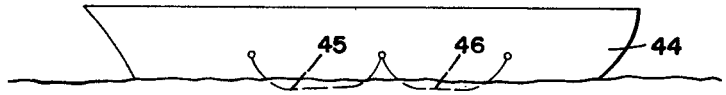
FIGURE 8 is a side elevation similar to FIGURE 7 but with the conductor means floating on the surface of the water.
Figure 9:
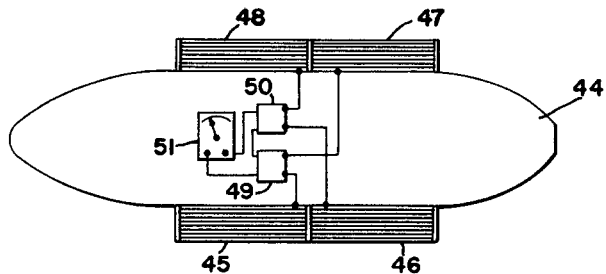
FIGURE 9 is a plan view of the vessel of FIGURE 8.
Figure 10:
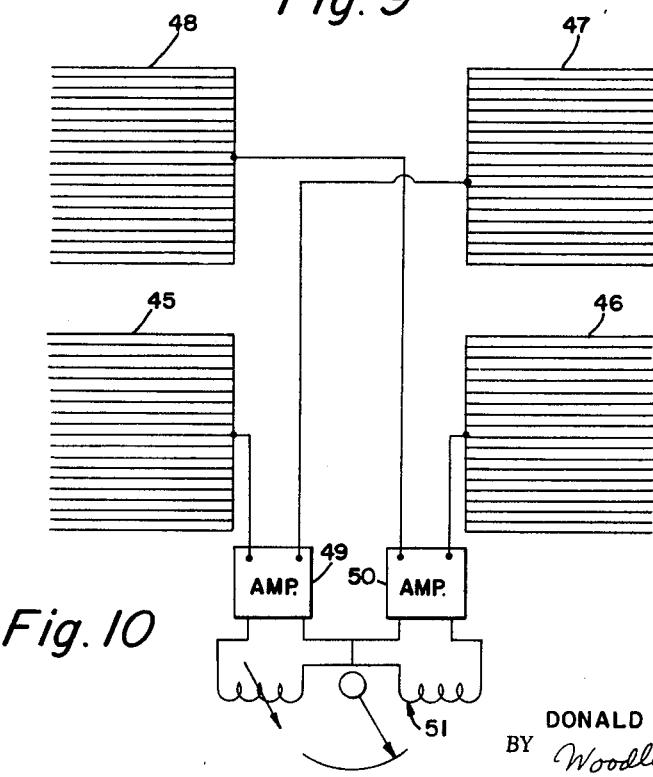
FIGURE 10 is a schematic diagram of the apparatus of FIGURE 9.

FIGURES 7 to 10 indicate the arrangement wherein four floating wire mats 45–48 can be used. FIGURE 7 indicates the mats being held up against the sides of the ship 44 when not in use. FIGURE 8 indicates the mats 45–48 in the operating position with the center of the mats floating on the surface of the water. FIGURE 9 is a plan view of the same arrangement as FIGURE 8, and the mats 45–48 are further shown in a schematic arrangement in FIGURE 10. The mats 45–48 may again be considered as conductor means each having a plurality of mutually insulated conductors, electrically connected together at the proximate ends of the two mats on each side of the vessel 44. The insulation on the conductors may supply the buoyancy for the mats. Preferably the forward ends of the individual conductors in the forward mats 45 and 48 terminate near the point where the front of the mats leave the water. Similarly, the rear ends of the conductors in the rear mats 46 and 47 terminate near the point where the rear of the mats leave the water. The amplifiers 49 and 50 may be operated in phase opposition or in phase depending upon the polarity of one of the coils of the meter 51. This arrangement permits the cancellation of large earth potentials that have a uniform front to both sets of elements. Local variations will become more apparent as one set of mats will have a different potential to another set with respect to the direction in which the variation in potential is occurring.

Figure 11:
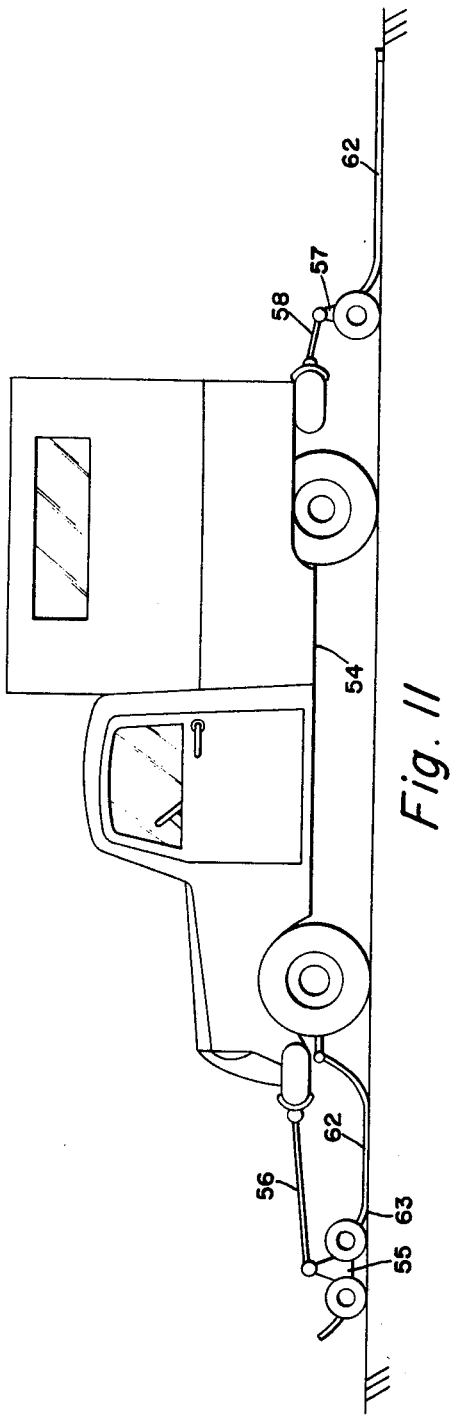
FIGURE 11 is a side elevation of a motor vehicle and first and second conductor means.
Figure 12:
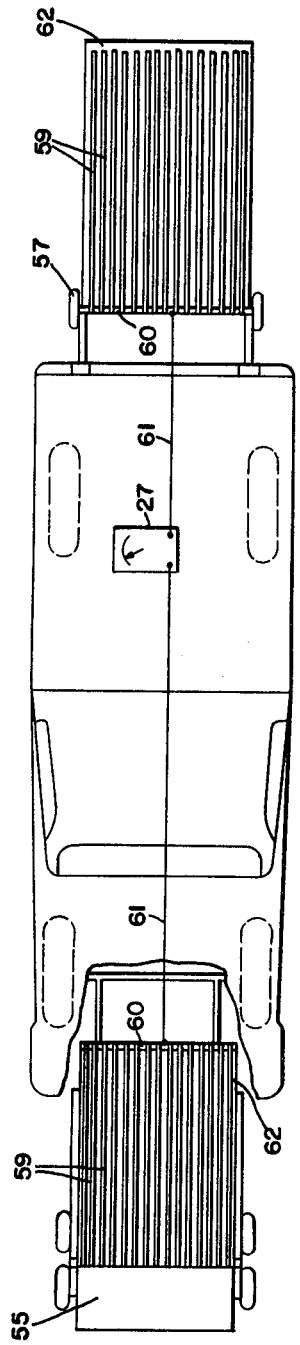
FIGURE 12 is a plan view of the apparatus of FIGURE 11.

FIGURES 11 and 12 illustrate a method and arrangement for skimming two electrostatic elements along the surface of the earth. The motor vehicle 54 pushes the small truck 55 by the rod 56 and tows the trailer 57 by the rod 58. The conductors or wire elements 59 are connected at 60 to the leads 61 and thus to the meter 27, as shown in FIGURE 12. The open ends of the electrostatic wire elements 59 point away from the vehicle. In this manner, variations in the electrostatic field created by the earth currents may be measured while on the move. The conductors 59 may be relatively insulated and insulated from ground by being embedded in insulation, such as rubber mats 62. The forward ends of the conductors in the front mat 62 preferably terminate at the point 63 where the conductors leave close proximity to the earth's surface.

Figures 13, 14:
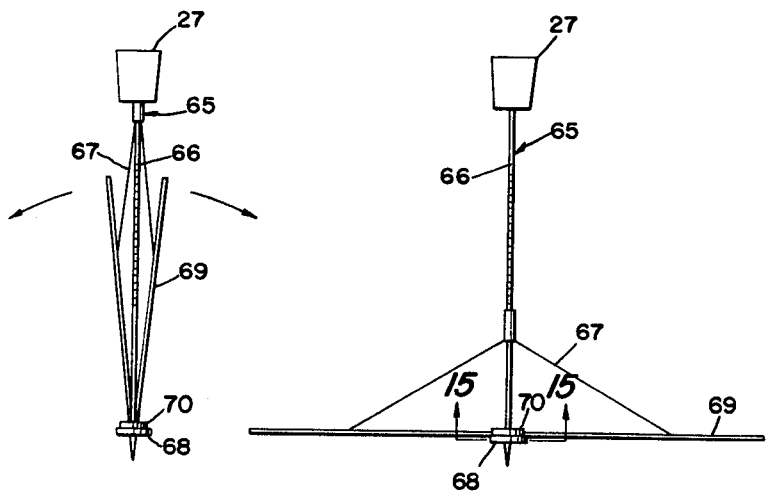
FIGURE 13 is a side elevation of another modification in collapsed position.
FIGURE 14 is a side elevation of the apparatus of FIGURE 13 in extended position.
Figure 15:
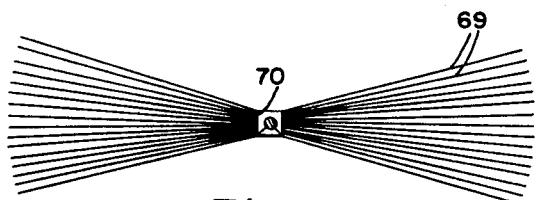
FIGURE 15 is a view on line 15—15 of FIGURE 14.

FIGURES 13–15 illustrate a manually operated instrument 65 suitable for easy carrying and taking spot measurements. The arrangement is somewhat like the mechanism of an umbrella wherein the rod or handle 66 has mounted thereon a collapsible carriage 67 connected to electrostatic elements or conductors 69 pivoted to an insulator block 70. A base disc 68 limits the penetration into the ground and a meter or indicating unit 27 is mounted on the top of the handle. With the insulated conductors 69 extended parallel to the ground as shown in FIGURE 14 and connected as in the arrangement shown in FIGURE 3, the earth potentials may be measured and the relative potentials with respect to direction are obtained by rotating the instrument through 360°.

Figure 16:
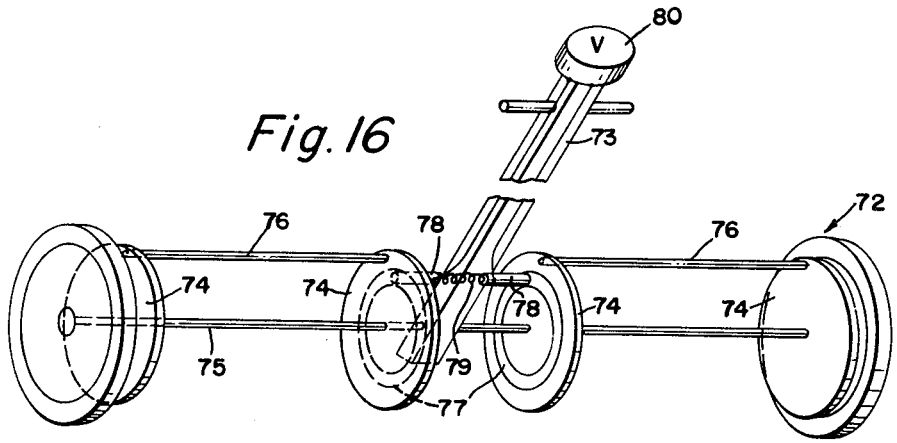
FIGURE 16 is an isometric view of another modification of the invention.

FIGURE 16 shows a further modification wherein a wheeled carriage 72 may be propelled in any suitable manner, such as by being pushed by an operator holding a manual handle 73. Four insulator discs 74 are mounted on the axle 75 of the wheeled carriage 72 and each pair of discs 74 mounts one end of a rigid conductor 76. These conductors may be in the form of conductive tubing, for example. Slip rings 77 are mounted on the inner surfaces of the inner insulator discs 74 to cooperate with brushes 78, in turn connected to a voltmeter 80. The brushes 78 are shown urged apart by a spring 79 but are electrically insulated from each other. The wheeled carriage 72 may be of all insulating material if desired to eliminate the proximity of any conductive materials.

Figure 17:
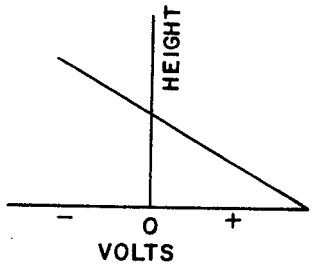
FIGURE 17 is a graph of voltage vs. height.

As stated above, the potential in the lower atmosphere exchange layer immediately adjacent the earth's surface undergoes a reversal of polarity at differing elevations relative to the earth. This is illustrated in FIGURE 17 where closely adjacent the earth's surface, the polarity in this exchange layer is positive relative to the earth. At some altitude above the earth, usually within 12", the polarity reverses to be negative relative to the earth. Under certain conditions of earth moisture content, latitude, longitude and constitution of the earth, this has been found to be about 6". Under these conditions, with wheels of the carriage 72 being about 12" in diameter, the conductors 76 would experience different polarities of potential relative to the earth as the carriage 72 is rolled along the surface of the earth. The conductors 76 would be first and second conductor means which are capable of being positioned within the lower atmosphere exchange layer. These conductor means will develop a direct current voltage therebetween. Because of the movement of these conductors close to and farther away from the earth's surface, this direct current voltage will be changed by motion of the carriage 72 into an alternating voltage. Accordingly, the meter 80 may be an alternating current meter or may be a direct current meter if only slow changes are contemplated.

Figure 18:
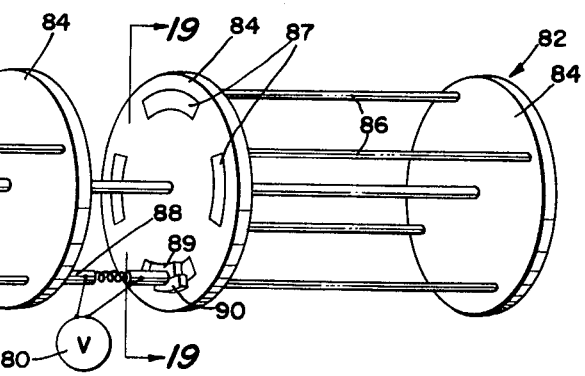
FIGURE 18 is an isometric view of another modification.
Figure 19:
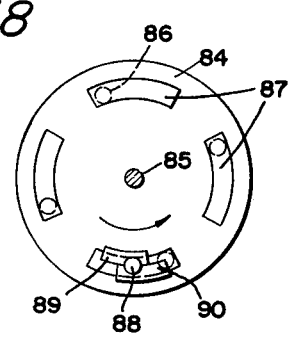
FIGURE 19 is a sectional view on line 19—19 of FIGURE 18.
Figure 20:
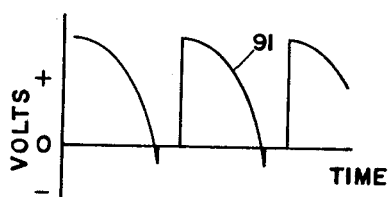
FIGURE 20 is a graph of voltage vs. time.

FIGURES 18 and 19 illustrate another modification of the invention wherein a wheeled carriage 82 may be used. This carriage may be propelled along the surface of the earth in any suitable manner, for example, by the same means as shown for FIGURE 16. Insulating discs 84 are mounted on an axle 85 and each pair of discs mount a plurality of conductors 86. These conductors 86 are self-supporting, such as being formed of metal tubing. Commutator segments 87 are connected to each of the individual conductors 86 and form a commutator on the inner faces of the two inner insulating discs 84. Brushes 88 coact with these commutator segments 87 to convey the voltage picked up on the conductors 86 to the meter 80. Each of the brushes 88 may have mounted thereon brush segments 89 and 90 which are arcuately slidable relative to each other to change the effective width or arcuate extent of each brush. In this manner, the dielectric space between each commutator segment may or may not be bridged by the brush face, as desired. Also, the portion of arc of movement of the commutator segment in which contact therewith is made by the brush may be varied. The FIGURES 18 and 19 show the brushes 88 near the low point of the insulator discs 84 to pick up the voltage of those conductors 86 which are at that time closely adjacent the earth's surface. The voltage picked up by the conductors 86 will be a maximum, as these conductors are at their closest spacing to the earth's surface. Upon rotation of the insulator discs 84, the conductors 86, at that instant connected to the meter 80, will move away from the earth's surface to pick up a progressively smaller voltage. With the insulator discs 84 of large enough diameter, for example, from one to three feet, then the conductors instantaneously connected to the meter 80 may pass from a region of picking up positive polarity voltage to a region of picking up negative polarity voltage before the brushes break electrical contact with the respective commutator segment. A sawtooth voltage wave 91, as illustrated in FIGURE 20, may may thus result. This will again be an alternating voltage as applied to the meter 80, however, each individual pair of conductors 86 will receive a direct current potential difference thereon.

The conductors in FIGURES 16 and 18 may be from two to eight feet in length with spacing between the conductor means as close as a few inches or as great as several feet. In the arrangement of FIGURES 16–18 the conductors 76 and 86 may be insulated if desired or may be left bare and uninsulated if the wheeled carriages are to be used on surfaces which will not ground the individual conductors. In this case, the means insulating the conductors relative to ground will be achieved by the insulator discs 74 and 84.

PERFORMANCE

The following description of the function of the insulated conductor mat will permit a better understanding of the requirements. There exists a layer in the air adjacent to the ground having both an electrical field and electrical conductivity created by emanation of radiation from the earth's surface. Generally speaking, this is referred to as the exchange layer or more specifically, this is the lower portion of the exchange layer. Unlike the higher elevations, a space charge is not maintained in the immediate vicinity of the land or soil, primarily due to ionization of the atmosphere by the radioactive emanations from the surface. The ever changing earth currents induce relative potentials into the exchange layer. The conductivity of the soil largely influences the relative amount of earth's currents distribution vertically. With increased surface moisture, the earth currents are closer to the surface and result in producing greater potentials in the exchange layer. Inversely, very dry soil on the surface reduces the potentials in the exchange layer. The electrode mats herein referred to are similar in their design to a Faraday electrostatic shield normally used to prevent the radiation of spurious electric fields.

It has been found that the pickup requirements in this lower exchange layer preferably have extremely high impedance characteristics and not high capacitive characteristics. To obtain these, it is found that wires with open ends directed toward the opposite potential desired to be measured is most effective and that a multiplicity of open ended wires will produce a greater potential exchange. In the case of the floating elements on the surface of the water, the physical arrangement to maintain the high impedance indicates a relatively thin wire should be used in a large area of insulation that is buoyant and the insulation in the case of FIGURES 7 to 10 would be the means of suspension from the ship to the water whereas the conductive portion of the electrode would end on the surface of the water in the case of the open end of the mat electrodes.

The purpose of the measurements is to determine the direction or magnitude of the earth's currents at any given time at any one location and in addition, the volume of the currents should be known and compared with a monitoring fixed recorder in the same meridian for correction when interpreting the results.

It has been found that the earth currents have nearly identical diurnal curves with the respective magnetic component in geomagnetic measurements. It has also been found that the earth currents lead the magnetic curves by approximately 30 to 40 degrees.

In the various modifications of the invention, all show use of first and second conductor means disposed generally along a longitudinal axis. One or more conductors in each conductor means extend generally parallel to this axis. Where a plurality of conductors are used in each conductor means, the ends of the conductors which are more closely spaced, namely the first ends thereof, are interconnected and connected to the load or measuring device. The remote ends of these conductors are mutually insulated. It has been found that there is a greater voltage pickup the more open conductor ends are utilized. Also, a greater voltage pickup is achieved if the alignment of the entire electrical device is with its axis parallel to the direction of the telluric currents. This is generally along an east-west path. Also, a greater voltage pickup is experienced with the conductor ends themselves disposed along this axis or east-west path. Still further, a greater voltage pickup is experienced with the conductor means more closely spaced relative to the earth's surface and with a greater spacing between the first and second conductor means. In the voltage device as shown in FIGURES 13–15, the spacing between the inner ends of the first and second conductor means is quite small, a matter of inches. However, a greater number of individual conductors may be used and these may be placed in close proximity to the earth.

In the arrangements shown in FIGURES 2, 4, 5, 6, 9 and 12, the spacing between the two conductor means may be several hundred feet if desired. It has been found that if the lead-in wire from the conductor means to the load or measuring device is spaced at too high an elevation to the earth's surface, then a negative polarity voltage will be picked up on this lead-in wire, as will be evident from FIGURE 17. Accordingly, it is preferred that the lead-in wires be kept close to the surface of the ground over a majority of their length. This results in maximum voltage pickup. For good voltage pickup, a majority of the total length of the conductor means and the lead-in wires should be spaced in close proximity to the earth's surface.

The first and second conductor means of the various modifications are capable of picking up the direct current voltage proportional to the telluric currents flowing in the earth. These are considered as direct current voltages, even though it is recognized that the telluric currents do undergo a cyclical change of one cycle per 24 hours. I have found that a direct current meter will follow variations in the order of one cycle per second and, accordingly, no problem is found in following voltages varying at one cycle per day. In the arrangements shown in FIGURES 16 and 18, if the wheeled carriages are moved slowly, direct current meters may be used and it is contemplated that any alternating voltages of less than one cycle per second are nominally within range of what is termed direct current measurements. The arrangements of FIGURES 16 and 18 utilize motion of the conductors to transform a direct current voltage pickup into an alternating current voltage. These arrangements of FIGURES 16 and 18 do provide means to space the conductors within six inches of the earth's surface and, accordingly, are well within the lower atmosphere exchange layer.

The voltage picked up by the various embodiments of the invention may vary considerably. In the arrangements of FIGURES 4 or 13, for example, the voltage may only be in the order of microvolts. In other arrangements, such as FIGURES 2, 5 or 6, for example, the greater spacing of the conductor means and the greater number of individual conductors will establish voltages in the order of millivolts. Readings as high as several hundred millivolts or even one volt may be experienced.

Figure 21:
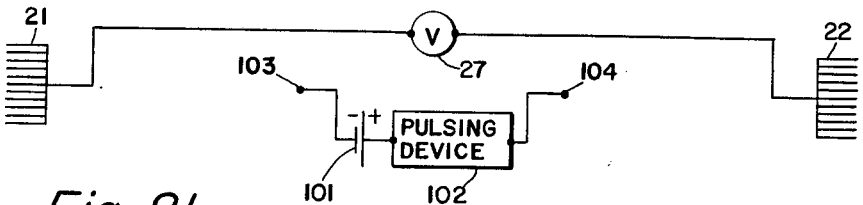
FIGURE 21 is a schematic diagram of an electrical transducer.

FIGURE 21 shows schematically an electrical transducer used as a telluric voltage pickup device. The first and second conductor means 21 and 22 may be the same as in previous constructions and are connected to a meter or load 27. This pickup device is a voltage pickup device responsive to the telluric currents and generally for maximum voltage pickup the axis along which the first and second conductor means 21 and 22 are disposed should be a magnetic east-west axis.

A D.C. voltage source 101 illustrated as a battery is connected in series with a pulsing device 102 of any desired construction. This may be a motor driven cam operated switch for example, to pulse the voltage one second on and four seconds off, merely as an example. This voltage is applied to first and second electrodes 103 and 104 respectively which are driven into the ground along the east-west axis on which the conductor means 21 and 22 are located and spaced symmetrically with respect to the conductor means. Merely as an example, one arrangement which has been found to operate satisfactorily is to have the electrodes spaced about fifty feet and the conductor means spaced about two hundred feet apart. The conductor means are insulated but resting on the ground, and the electrodes are copper rods driven three or four feet into the ground. It has been found that 12 volts applying a current of about 100 milliamps to these electrodes spaced about fifty feet apart provides a pulsating earth current which is detectable on the voltmeter 27 through the terrain and picked up by the conductor means 21 and 22.

Figure 22:
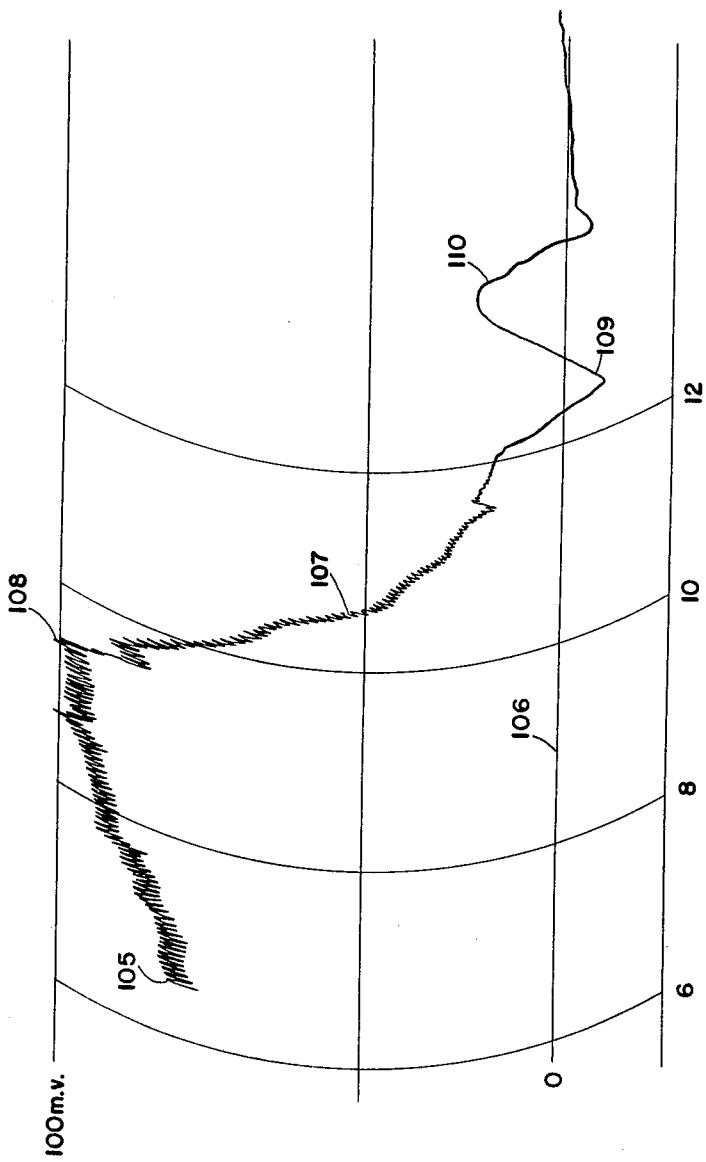
FIGURE 22 is a graph of voltage vs. time.

FIGURE 22 illustrates a typical voltage curve 107 received on a recording voltmeter acting as the voltmeter 27 is shown in FIGURE 22. The pulsing D.C. source connected to the electrodes 103 and 104 is in operation and at point 105 on the curve the telluric currents were fairly high as evidenced by the relatively high voltage pickup, arbitrarily chosen as positive relative to the zero axis 106. Full scale reading was 100 millivolts relative to the zero base line 106. The telluric activity for this particular curve 107 of FIGURE 22 gradually increased to a maximum voltage pickup at about point 108. This might be over a two hour period for example. The telluric currents gradually decreased in this particular curve 107 over the next two hour period, until a generally zero voltage pickup was obtained at point 109. It will be noted that this curve 107 has superimposed thereon the variations in voltage pickup as caused by the D.C. voltage pulses coming from the pulsing device 102. It will be noted that the magnitude of the variations of the D.C. pulses is approximately linearly proportional to the potential gradient of the telluric voltage received. Accordingly, the amplitude of these D.C. pulse variations may be utilized as a calibration means to calibrate the sensitivity of the voltage pickup system at any instant. If the voltage is quite low, as shown at point 109 for example, the voltmeter scale may be changed to a lower scale, or if an amplifier is used to drive the voltmeter, the gain of this amplifier may be increased. Further observation of FIGURE 22 will reveal that the D.C. pulse variations on the telluric voltage pickup are not observable in the area of point 109 in this curve 107 because of the general decrease in the telluric currents at this time and resultant decrease in telluric voltage pickup.

If the first and second conductor means picks up a voltage which is representative of some telluric disturbance along the magnetic east-west axis along which these conductor means are placed, then this is the same axis as the electrodes 103 and 104, hence, the disturbance will cause a relatively large swing on the recording voltmeter at that point, for example at point 108, and because the electrodes 103 and 104 are on the same axis, it will be observed the D.C. pulse variations will be superimposed upon the telluric disturbance. However, if the telluric disturbance is along some axis other than the east-west axis, for example a northeast-southwest axis, then such a disturbance will be recorded as a large enough disturbance, such as at point 110, however, it has been observed that the D.C. pulse variations are not superimposed upon such disturbance when not oriented along the east-west axis of the electrodes 103 and 104.

Figure 23:
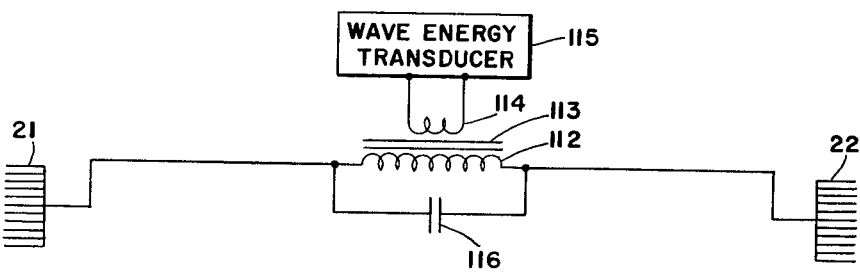
FIGURE 23 is a schematic diagram of a telluric transducer.

FIGURE 23 is a plan view of the first and second conductor means 21 and 22 connected through a transformer winding 112. This transformer winding is a part of a transformer 113 having another winding 114 connected to a wave energy transducer 115. If the system of FIGURE 23 is used as a voltage pickup device, then energy is received into the wave energy transducer 115 from the transformer 113. The transformer winding 112 and the core of the transformer 113 may be made a form of inductance as shown in my copending application Ser. No. 857,336, filed Dec. 4, 1959, entitled "Survey Apparatus And Method For Determining And Recording Minute Deviations In The Earth's Total Magnetic Field." The inductance of such a coil may be made very large in the order of thousands of henries. The inductance of such a large reactance is connected in circuit with the first and second conductor means 21 and 22 which naturally have a capacity relative to the earth. This capacity, plus a tuning capacitor 116 connected across the transformer winding 12 may be used to tune the entire circuit to a particular resonant frequency. Each conductor means 21 and 22, being insulated from ground, naturally has a very high resistance to ground and the voltmeter 27 in FIGURE 21 in order to read millivolts would also have a very high input impedance in the order of megohms. Since a D.C. voltage in the order of millivolts is obtained from these devices, as illustrated in FIGURE 22, a theory of operation is that gamma ray radiation from the surface of the earth ionizes the dielectric between the surface of the earth and the conductors of the conductor means 21 and 22 and this forms the ion current flow path which is observable on the voltmeter 27. In any event, it has been found that a responsive current flows in the conductor means 21 and 22 to the voltmeter 27, responsive to the telluric current in the earth.

When the circuit of FIGURE 23 is used as a transmitting device, it is more important to obtain a resonant circuit and the higher the Q of the circuit the better the transmission. In such case, the wave energy transducer 115 becomes the wave energy source supplying modulation or other intelligence to the system.

FIGURE 24 shows first and second conductor means 121 and 122 provide a first pair of conductor means disposed along an east-west axis. Third and fourth conductor means 123 and 124 provide a second pair of conductor means disposed along a north-south axis. The first pair of conductor means 121 and 122 are connected to an amplifier 125 and the pair of conductors means 123 and 124 are connected to an amplifier 126. First and second electrodes 127 and 128 are placed in the ground along the same east-west axis of the conductor means 121 and 122 and spaced symmetrically therebetween. Third and fourth electrodes 129 and 130 are placed in the ground along the same north-south axis of the conductor means 123 and 124 and spaced symmetrically therebetween. A goniometer arrangement of coils is provided including first and second coils 131 and 132 with the first coil 131 connected between the first pair of electrodes 127 and 128 and the second coil 132 connected between the second pair of electrodes 129 and 130. A modulating magnetic means is provided which may be a rotating electromagnet but which is shown as a rotatable permanent magnet 133 spaced for coupling with the coils 131 and 132. This is preferably rotatable on a vertical axis mutually perpendicular to the axes of the coils 131 and 132 although in the drawing of FIGURE 24 it is shown displaced for clarity. Drive means 134 is shown to rotate the permanent magnet 133 at any suitable speed for example, 240 r.p.m. Upon rotation of this magnet, sine waves of voltages are generated in the coils 131 and 132, with these generated voltages being displaced 90° in phase directly in accordance with the physical phase displacement of the coils. This small generated A.C. voltage is applied to the respective electrodes and, thus, may serve a calibration function similar to the D.C. pulsed voltage of the circuit of FIGURE 21. The received voltage will thus have superimposed thereon the sine wave modulating voltages. This may serve the same calibrating function as in FIGURE 21, where the amplifiers 125 and 126 feed a voltmeter device. The amplifiers 125 and 126 are shown as having their outputs connected through filters 135 and 136, respectively, to rectifiers 137 and 138, respectively. The outputs of these rectifiers 137 and 138 may be used as automatic gain controls for amplifiers 139 and 140, respectively. These amplifiers are connected in a second system of conductor means 141–144 physically displaced from the first set of conductor means 121–124. The amplifier 139 is connected to the inboard ends of conductor means 141 and 142 and the amplifier 140 is connected to the inboard ends of conductor means 143 and 144. It will thus be observed that with this connection, the A.C. modulating voltage applied to the electrodes 127 and 128 is applied on an east-west axis and is received through the terrain on the first and second conductor means 121 and 122. These conductor means are responsive to the telluric current with this modulation voltage superimposed thereon. This modulation voltage is passed by the low pass filter 135 and rectified in the rectifier 137. This, thus, becomes a D.C. control voltage to control the gain of the amplifier 139 which is connected to conductor means 141 and 142 which are also disposed on the magnetic east-west axis. A similar arrangement is provided for the electrodes and the conductor means disposed on the north-south axis. The automatic gain control to the amplifiers 139 and 140 may be connected to increase the gain of these amplifiers as the telluric voltage pickup decreases, as for example during the portion of curve 107, FIGURE 22 between points 108 and 109.

A marker pulsing device 145 may be driven in synchronism with the modulating voltages and this may be accomplished by drive from the drive means 134. This marker pulser 145 may apply marker pulse voltages to the amplifiers 125 and 126. Since the modulation voltages picked up by the conductor means 121 and 122 will be 90° out of phase with the modulation voltages picked up by the conductor means 123 and 124, this marker pulse supplied to both amplifiers provides a way of determining the physical orientation of the armature 133 with respect to the modulation effected by the modulation calibration voltages. This is a phase orientation pulse observable on the voltmeters connected to the amplifiers 125 and 126. Thus, where a disturbance comes in along a north-south axis for example, it will affect amplifier 126 much greater than the amplifier 125. Thus, the axis of the disturbance may be determined by comparing the phase of the marker pulse with the phase of the disturbance on each of the two amplifiers 125 and 126.

Figure 25:
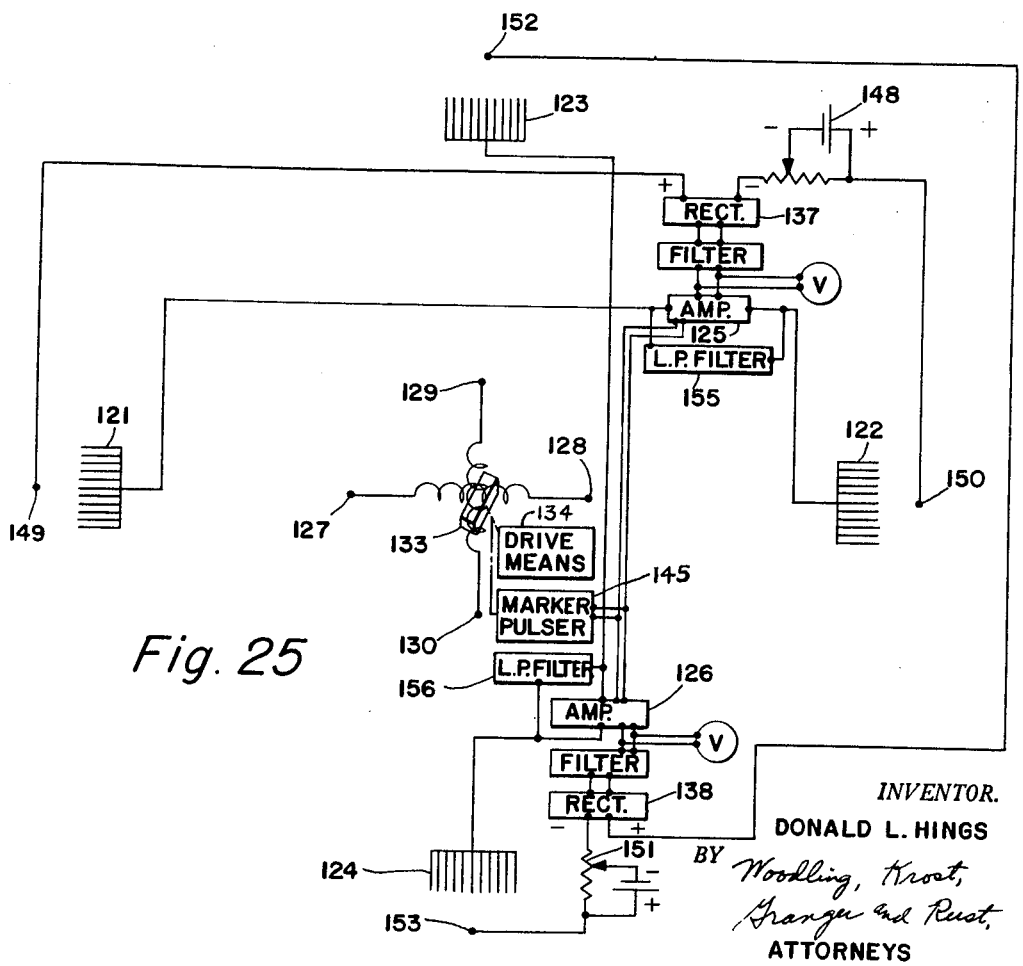

FIGURE 25 shows a system somewhat similar to that shown in FIGURE 24 including the conductors 121–124. Also the same electrodes 127–130 may be utilized with the goniometer arrangement of coils. The conductor means 121 and 122 are connected to the amplifier 125 but with the output of the rectifier 137 connected in opposition to a D.C. voltage source 148 and connected between electrodes 149 and 150 spaced symmetrically on the magnetic east-west axis and symmetrically outside the conductor means 121 and 122. Similarly, the output of the rectifier 138 is connected in opposition through a D.C. voltage source 151 to electrodes 152 and 153 spaced on the magnetic north-south axis and symmetrically outside the conductor means 123 and 124. The circuit arrangement of FIGURE 25 may be adjusted so that the output of the rectifiers 137 and 138 controls the amount of D.C. bias current or D.C. control current fed into the respective electrodes. A theory of operation is that this establishes a local current flow in the area of the terrain at which the conductor means 121–124 are located. A theory is that this increases the local ionic transfer during the period of low telluric currents, and accordingly, increases the sensitivity of the system. Again, this is a form of automatic gain control applied entirely within a single system. It has been found that during periods of low telluric currents such as shown at point 109 in FIGURE 22, the sensitivity of the system of FIGURE 24 may be increased by applying about 5 or 6 milliamperes of current to the electrodes.

Low pass filters 155 and 156 may be connected across the amplifiers 125 and 126 respectively to aid in maintaining a constant input impedance, e.g., one megohm, for these amplifiers and to bypass any stray power frequency voltages, e.g., 60 cycle voltages, which may be picked up on the conductor means. These low pass filters may be used on the other receiving systems heretofore described.

Figure 26:
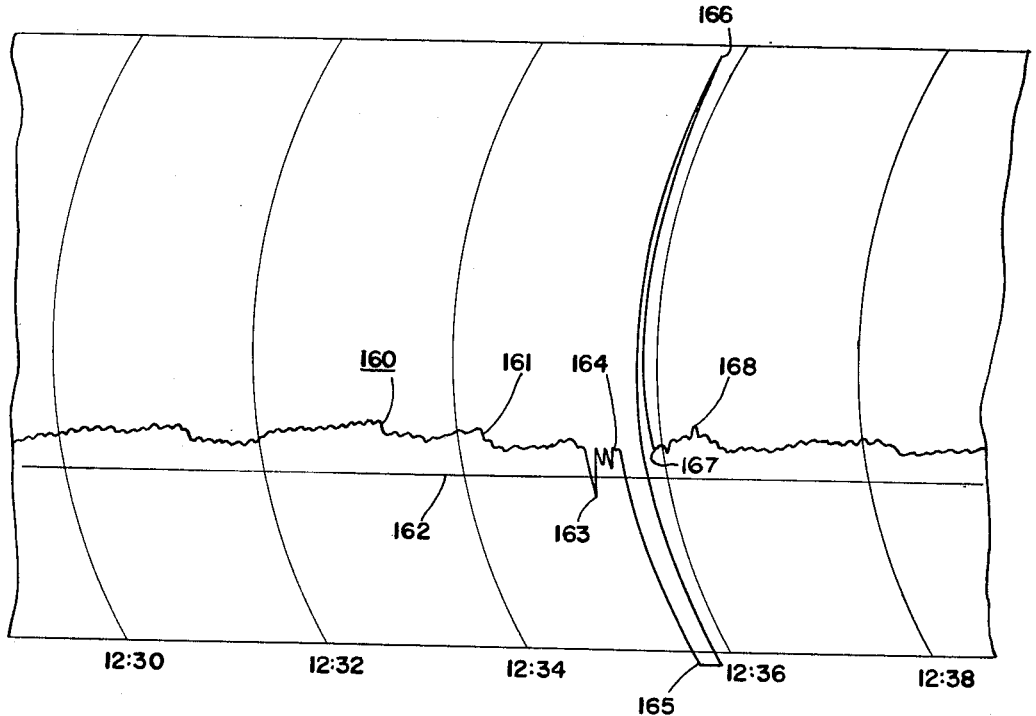
FIGURE 26 is a graph of voltage vs. time.

FIGURE 26 illustrates a curve 160 obtained from a recording voltmeter connected to a system similar to that shown in FIGURE 3 or 21. This is a high speed recording with two minutes elapsing between main division markings on the graph paper. Thus, the speed of the paper is about ¾" per minute. This is an actual recording taken starting at noon Oct. 25, 1961, at Vancouver, British Columbia, Canada.

The telluric current activity at the time was fairly low, as shown by the initial part 161 of the curve, which is close to the zero axis 162. At approximately 12:35 p.m. the voltmeter recording shows a sudden negative swing to a negative peak 163. This is an arbitrary designation with the westward conductor means or mat 21 obtaining a positive voltage relative to conductor means 22 positioned to the east.

This negative peak 163 gradually decreased to a point 164 which was nearly at the former level of telluric activity. Immediately thereafter, the voltmeter recording needle swung heavily negative against the physical stop, meaning that the voltmeter reading went off scale. This was at point 165. The voltmeter remained off scale for 14 seconds and then swung back to a strong positive peak 166. The voltmeter then oscillated to another negative peak 167 and again swung positive to a peak 168 which is the end of the disturbance. The time from peak 163 to peak 168 is 70 seconds.

This phenomenon coincided with information released in the newspapers the next day that the Russians had detonated a 30 megaton H bomb. It is considered well known that an H bomb uses an A bomb as a trigger to develop the high temperatures to detonate the H bomb. The peak 163 would, thus, coincide with the A bomb trigger and peak 165 would coincide with the main H bomb detonation. The time elapsed between the two, of about 14 seconds, is indicative of the yield of the 30 megaton bomb, since the longer the time between the trigger and the detonation of the H bomb, the bigger the yield. It will be observed that this recording was obtained at 12:35 and about 20 seconds, which coincides with the announced time of the blast. Since this was in Vancouver, B.C., many thousands of miles away from the Russian H bomb blast, this shows the disturbance of the telluric current activity travels at the speed of electromagnetic wave radiation rather than being dependent upon sound wave travel through the earth which is at a speed of about 1,500 to 2,000 feet per second. At about three seconds per mile, it would take about 6,000 seconds for sound to travel through the earth a distance of 2,000 miles. This recording was made at the time of the blast rather than 100 minutes later and, thus, it shows the atmospheric disturbance of an atmospheric H bomb explosion is readily receivable on the equipment of the present invention.

The conductor means of FIGURE 3 may be stranded copper wires for flexibility, imbedded in a rubber mat for insulation from the earth. The mats may be only 18" square, for example, with about fifty separate stranded wires all running parallel and interconnected at the inboard ends. Two such mats placed about 200 feet apart resting on the surface of the earth were used to record this curve 160 of FIGURE 26. An Electroline recording voltmeter was used in connection with a transistor amplifier to feed the voltmeter. A one megohm resistor was connected across the input terminals of the transistor amplifier to maintain substantially constant input impedance. Also a capacitor of 0.1 mfd. capacitance was connected across the input terminals to bypass the 60 cycle power frequencies and, thus, to have the transistor amplifier responsive only to the lower frequencies, such as the general fluctuations on the telluric current activity.

FIGURE 27 shows another telluric voltage system 170 without direct connection to the earth, for example, without the electrodes 127 to 130 of FIGURE 24. FIGURE 27 shows first through fourth conductor means 171–174 connected to the inputs of amplifiers 181 to 184, respectively. Coils 131 and 132 are again provided in a first goniometer arrangement and a second goniometer arrangement is provided by coils 175 and 176. These latter coils are fed from an oscillator 177 which has a double ended output with a 90 degree phase relation therebetween to feed the coils 175 and 176. This oscillator 177 may be in the low audio frequency range, for example, from two hundred cycles to ten thousand cycles and, accordingly, a rotating field is established to affect the first goniometer coils 131 and 132. It will be noted that this oscillator 177 and associated goniometer coils are thus similar to and replace the rotating permanent magnet 133 of FIGURES 24 and 25.

The goniometer coil 131 is connected between the outputs of amplifiers 181 and 182 and the other output terminals of these amplifiers are connected to a pair of plates 191 and 192 of a main oscilloscope 195. The coil 132 is connected between the outputs of amplifiers 183 and 184 and the other output terminals of these amplifiers are connected to another pair of plates 193 and 194 in the oscilloscope 195. A recording device such as a movie camera 196 may be connected for operation by a link 197 to the oscilloscope 195 and the camera 196 may be used to photographically record the various images on the face of the oscilloscope 195.

Figure 28:
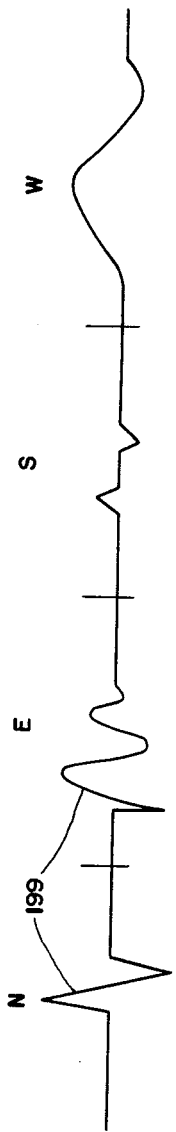

FIGURE 28 illustrates possible variations in voltage vs. time as may affect the system 170 of FIGURE 27. The system 170 shows a means of obtaining a high speed scanning wherein frequencies up to five or ten kilocycles may be observed on an oscilloscope. Another purposes of system 170 is to permit direction finding of the direction of telluric disturbances without use of any direct connection to the ground, namely, without any electrodes connected to the ground, and with this direction finding accomplished at a high speed of response. FIGURE 28 illustrates different possible voltage disturbances or a voltage wave pattern 199 as it would appear on a linear sweep oscilloscope pattern with relation to time, sweeping from left to right. This voltage wave pattern 199 is what would appear on an oscilloscope if the output of all amplifiers 181–184 were connected to the vertical plates of an oscilloscope and the horizontal plates of the oscilloscope were connected to a sweep circuit. The function of the goniometer voltage from oscillator 177 is to bias off one amplifier completely with the opposite amplifier biased into operation. This sequential biasing of the amplifiers is in a clockwise direction and it may be visualized that basically only one amplifier is at full amplitude at any given time in the north, east, south and west directions.

Figure 30:
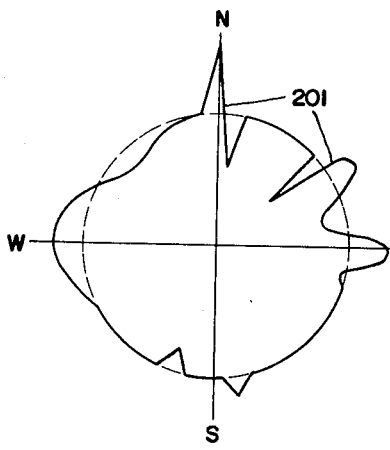
FIGURES 28–30 and 32 are oscilloscope patterns of FIGURE 27.
Figure 32:
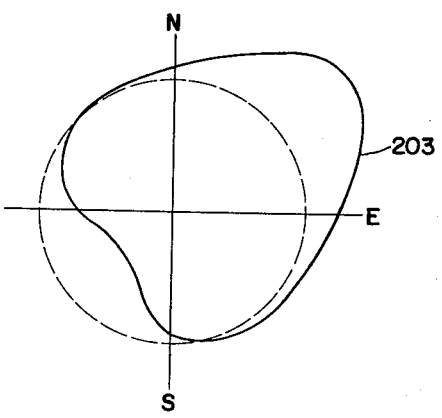
Figure 29:
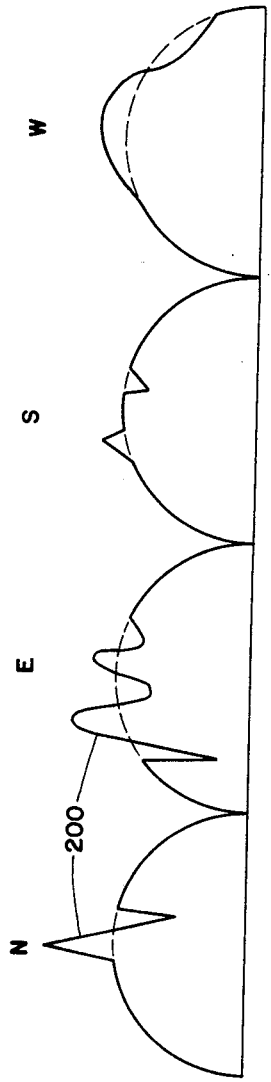
Figure 31:
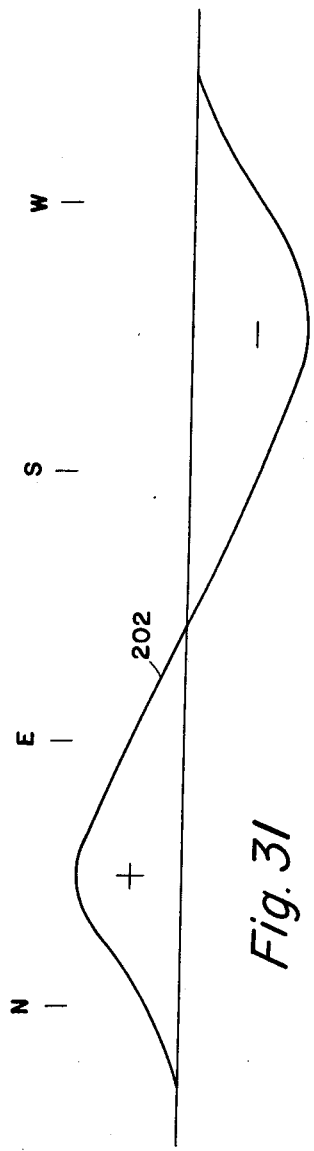
FIGURE 31 is a graph of voltage vs. time.

The action of the system 170 is that the oscillator fed goniometer coils 175 and 176 electronically switch off the amplifiers in a clockwise sequence. FIGURE 29 shows voltage wave patterns 200 which are based upon the voltage wave pattern 199 of FIGURE 28 but translated into a curved base line. FIGURE 30 shows a voltage wave pattern 201 as would actually occur on the oscilloscope 195 of FIGURE 27 with telluric voltage disturbances obtained from the directions indicated in FIGURE 28. FIGURE 31 illustrates a voltage wave 202 of relatively long duration with the D.C. telluric current flowing positive to the NE. and negative to the SW. FIGURE 32 illustrates the oscilloscope pattern 203 which would result from the voltage wave 202 of FIGURE 31. The oscilloscope pattern 203 is a cardioid pattern having a lobe toward the NE. and a null toward the SW. The pattern of FIGURE 32 will occur whenever the circular sweep frequency on the oscilloscope, as determined by the goniometer coils 175 and 176, is faster than the telluric current change. Accordingly, it is possible, with sweep rates in excess of about 500 cycles per second, to monitor the lower audio frequency spectrum that may be modulating the telluric currents. This relatively fast response time not only gives the azimuth for the incoming signal, NE. in this illustration, but also permits detection by this oscilloscope means rather than the voltmeter means of many preceding figures, and also permits recording of the information for intelligence purposes, for example communications.

As an example of the sweep frequencies for read out purposes by the camera 196, the oscilloscope 195 would have a sweep frequency period in the order of seconds. The movie film would be exposed one frame for each complete sweep period and then moved to the next frame and exposed for the next sweep frequency period. The movie camera 196 would be synchronized with the oscilloscope 195 for this purpose by the link 197. In this manner, a permanent record may be obtained with economical use of movie film with each frame showing a pattern somewhat similar to the pattern 201 of FIGURE 30. The exact pattern on each frame of movie film would of course be dependent upon the telluric voltage disturbance in all azimuthal directions.

An auxiliary unit 206 may be connected to the oscilloscope 195. This auxiliary unit controls an auxiliary system 170A similar to the system 170 but operating at a higher sweep frequency. This could be connected off the same conductive means 171–174 and the same amplifiers 181–184 but utilizing a separate high speed goniometer for high speed sweeping, for example, this might be a ten or one hundred times faster sweep frequency. An auxiliary oscilloscope 207 and auxiliary movie camera 208 controlled by link 209 may be used in the auxiliary system 170A. A strong surge on the system 170 would act on the auxiliary unit 206 to trigger off the auxiliary system 170A. The strong surge might be similar to explosion of a nuclear bomb which would thus trigger off the high speed sweep system 170A and camera 208 would then photograph the face of the oscilloscope 207 to obtain photographic records of the direction of the potentials created by the bomb burst, as in FIGURE 32. In this manner, both high frequency and low frequency responses may be monitored continuously and automatically. The choice of movie frame speeds may range from a fraction of a second to many seconds for each cycle of the circular sweep.

FIGURE 27 shows a telluric voltage system which utilizes conductor mats or conductor means for direction finding purposes without the aid of additional external control to the surface of the earth as in FIGURES 24 and 25. Accordingly, it may be used more suitably on water or over difficult terrain and does not have any physically moving parts, being entirely electronic.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A telluric current responsive device comprising, in combination, first and second conductive means, each of said conductive means including a plurality of conductors each of which is sinuous and interlinks the adjacent conductor, means to relatively insulate said first and second conductive means and to insulate each from ground, a transducer responsive to continuous direct current connected between said first and second conductive means, and means to position said conductive means in close proximity to and above the surface of the earth up to approximately twelve inches spacing wherein such positioning establishes a responsive continuous variable direct current flow between said first and second conductive means responsive to variations in telluric current in the earth.

2. A device according to claim 1, including a wheeled carriage movable over the surface of the earth, said conductive means including a plurality of conductors substantially parallel to and spaced from the axis of said wheeled carriage to be cyclically moved into and out of position spaced closely to the surface of the earth, two terminals on said carriage, and commutator means providing connection to said terminals and sequential connection to said conductors.

3. A voltage pickup device comprising, in combination, first and second conductor means each having first and second ends, means relatively insulating said conductor means from ground, said conductor means being relatively positioned with said second ends thereof pointing in opposed directions, a voltmeter responsive to continuous direct current, the first ends of said conductor means being connected to said voltmeter, a majority of the length of each said conductor means positioned at least part of the time within the lower atmosphere exchange layer immediately adjacent the earth's surface within the influence of telluric current flow to develop continuously a direct current in response thereto between said conductor means, said conductor means including a plurality of conductors, a commutator having segments, at least one conductor radiating generally radially from and connected to each segment of said commutator, commutator brushes co-acting with said commutator and connected to said voltmeter, and means to effectively vary the width of said commutator brushes to be responsive to voltage on a plurality of conductors.

4. A voltage pickup device comprising, in combination, first and second conductor means each having first and second ends, means relatively insulating said conductor means from ground, said conductor means being relatively positioned with said second ends thereof pointing in opposed directions, a voltmeter responsive to continuous direct current, the first ends of said conductor means being connected to said voltmeter, a majority of the length of each said conductor means positioned at least part of the time within the lower atmosphere exchange layer immediately adjacent the earth's surface within the influence of telluric current flow to develop continuously a direct current in response thereto between said conductor means, a wheeled carriage, a manual handle to effect movement of said wheeled carriage along the surface of the earth, said first and second conductor means including first and second conductors mounted on said wheeled carriage parallel to the axis of a wheel thereof for movement between first and second positions with said first position being substantially parallel to and closely adjacent the surface of the earth, slip rings on said wheeled carriage connected to said first and second conductors, and collector brushes co-acting with said slip rings and connected to said voltmeter.

5. A voltage pickup device comprising, in combination, first and second conductor means each having first and second ends, means relatively insulating said conductor means from ground, said conductor means being relatively positioned with said second ends thereof pointing in opposed directions, a voltmeter responsive to continuous direct current, the first ends of said conductor means being connected to said voltmeter, a majority of the length of each said conductor means positioned at least part of the time within the lower atmosphere exchange layer immediately adjacent the earth's surface within the influence of telluric current flow to develop continuously a direct current in response thereto between said conductor means, a wheeled carriage movable over the surface of the earth, said conductor means each including a plurality of conductors parallel to and spaced from the axis of a wheel of said wheeled carriage to be cyclically moved between first and second positions with said first position being substantially parallel to and spaced closely to the surface of the earth, first and second commutators connected to said first and second conductor means respectively with a commutator segment connected to each said conductor, first and second commutator brushes coacting with said first and second commutators respectively and connected to said voltmeter, and means to change the effective width of said commutator brushes.

6. A voltage pickup device comprising, in combination, first and second conductor means, said first conductor means including a plurality of conductors directed generally in the same azimuthal direction and each having first and second ends, said second conductor means including a plurality of conductors directed generally in the same azimuthal direction and each having first and second ends, means electrically connecting together the first ends of the plurality of conductors in said first conductor means, means electrically connecting together the first ends of the plurality of conductors in said second conductor means, means relatively insulating the second ends of the plurality of conductors in each said conductor means, said conductor means being relatively positioned with said second ends of said conductors farther apart than said first ends and pointing in opposed directions, a load, a lead-in from each conductor means first end to said load, said first and second conductor means being mutually insulated except through said load, each said conductor means adapted to be positioned above the earth's surface and within the lower atmosphere exchange layer immediately adjacent the earth's surface within the influence of telluric current flow to develop a direct current voltage between said conductor means.

7. A geophysical instrument as claimed in claim 6, wherein each said conductor means includes a plurality of conductors mounted on a carriage with said conductors in each said conductor means diverging slightly relative to each other, a manual handle disposable vertically, means to mount a voltmeter as said load on the upper end of said handle and means to collapse said carriage with said first and second conductor means thereon to have said conductor means in a position alongside said handle, and means to extend said carriage with said first and second conductor means generally perpendicular to said handle.

8. A geophysical instrument as described in claim 6, wherein each of said conductors is sinuous and interlinks the adjacent conductor.

9. A geophysical instrument as claimed in claim 8, wherein each of said conductor means is in the form of a thin conductor mat of electrical conductors.

10. A geophysical instrument as claimed in claim 9, wherein both of said conductor mats are mounted on a rotatable platform for rotation therewith on a generally vertical axis, and slip rings providing electrical connection between each of said conductor mats and said voltmeter.

11. A geophysical instrument as claimed in claim 6, wherein each of said conductor means is in the form of a thin conductor mat of electrical conductors, the insulating means is a buoyant insulating means for each of said conductors to buoyantly support said conductor mats on a body of water, and means for towing said two conductor mats, one behind the other, behind a surface vessel carrying said voltmeter.

12. A geophysical instrument as claimed in claim 6, including movable supporting means to mount said conductor means on each side of a surface vessel to carry said conductor means on the sides of the vessel and to be lowerable to the surface of the water to be floatingly supported thereon, said vessel carrying said voltmeter.

13. A geophysical instrument as claimed in claim 6, wherein each said conductor means is in the form of a thin conductor mat of electrical conductors, first and second wheeled trucks supporting the forward end of said first and second conductor mats, respectively, said wheeled trucks adapted to be pushed or pulled by a motor vehicle relative to the surface of the ground with said voltmeter in said motor vehicle.

14. In combination, means for establishing a flow of earth current in addition to the telluric current and including an alternating voltage source and means to apply said alternating voltage to the earth to establish said flow of earth current, means for establishing a current conducting path responsive to continuous telluric current and the earth current from the earth, said means comprising conductive means insulated from the earth and having first and second spaced conductive portions between which said responsive current flows, load means responsive to the continuous telluric and earth current flow between said spaced portions and connected in said current conducting path.

15. A telluric voltage pickup device comprising, in combination, first and second electrical pickup units adapted to be placed on the surface of the earth along a first line, a voltmeter connected to said two pickup units, said pickup units to measure current proportional to the D.C. value of the telluric current comprising a plurality of conductors interconnected at first ends and electrically insulated at the second ends thereof, first and second electrodes adapted to be connected to ground and spaced along a line generally parallel to said first line, a variable voltage source connected to said two electrodes to apply thereto a variable voltage, said variable voltage on said electrodes establishing a measurable voltage on said voltmeter in accordance with the D.C. value of the telluric currents measurable on said voltmeter, whereby the amplitude of said variable voltage received at said voltmeter affords continuous indication of the sensitivity of the device for said current measurements received on said voltmeter.

16. A telluric voltage pickup device comprising, in combination, first and second electrodes adapted to be driven in the ground along an east-west line and spaced in the order of fifty feet apart, first and second electrical pickup units adapted to be placed on the surface of the earth along said east-west line and spaced in the order of two hundred feet apart and substantially uniformly spaced on opposite sides of said electrodes, a voltmeter connected to said two pickup units to measure current proportional to the D.C. value of the telluric current, said pickup units comprising a plurality of conductors interconnected at the proximal ends and electrically insulated at the distal ends, a pulsing D.C. voltage source connected to said two electrodes to apply thereto a pulsed voltage, said pulsed voltage on said electrodes establishing through the terrain a measurable voltage on said voltmeter in accordance with the D.C. value of the telluric currents, whereby the amplitude of said voltage pulses received at said voltmeter affords continuous indication of the sensitivity of the device for said current measurements received on said voltmeter.

17. A telluric voltage pickup device comprising, in combination, a first pair of electrodes adapted to be connected to the ground along a first axis and spaced apart a first distance, a second pair of electrodes adapted to be connected to the ground along a second axis and spaced apart in the order of said first distance with the axes crossing at a first angle and said electrodes substantially symmetrically spaced with respect to the intersection of said axes, first and second goniometer coils with said first coil connected between said first pair of electrodes and with said second coil connected between said second pair of electrodes, means to generate in said first and second coils variable calibration voltages displaced in phase in accordance with said first angle, a first pair of electrical conductor pickup units adapted to be placed close to and insulated from the surface of the earth along said first axis and substantially symmetrically spaced relative to the intersection of said axes and spaced apart a second distance greater than said first distance, a second pair of electrical conductor pickup units adapted to be placed close to and insulated from the surface of the earth along said second axis and substantially symmetrically spaced relative to the intersection of said axes and spaced apart substantially said second distance, a first voltmeter connected responsive to the output of said first pair of pickup units to measure current proportional to the D.C. value of the telluric currents, a second voltmeter connected responsive to the output of said second pair of pickup units to measure current proportional to the D.C. value of the telluric currents, said variable calibration voltages on said electrodes establishing through the terrain a measurable effect on said voltmeters by modulation of the D.C. value of the telluric currents and the proportional currents measurable on said voltmeters, whereby the amplitude of said calibration voltages received at said voltmeters affords continuous calibration for the current measurements received on said voltmeters, and whereby the relative amplitudes of the voltages on said first and second voltmeters establish the azimuthal direction of the telluric current flow by the phase amplitude relation.

18. A telluric voltage pickup device comprising, in combination, a first pair of electrodes adapted to be connected to the ground along a first axis and spaced apart a first distance, a second pair of electrodes adapted to be connected to the ground along a second axis and spaced apart in the order of said first distance with the axes crossing at a first angle and said electrodes substantially symmetrically spaced with respect to the intersection of said axes, first and second goniometer coils with said first coil connected between said first pair of electrodes and with said second coil connected between said second pair of electrodes, means to generate in said first and second coils variable calibration voltages displaced in phase in accordance with said first angle, a first pair of electrical conductor pickup units adapted to be placed close to and insulated from the surface of the earth along said first axis and substantially symmetrically spaced relative to the intersection of said axes and spaced apart a second distance greater than said first distance, a second pair of electrical conductor pickup units adapted to be placed close to and insulated from the surface of the earth along said second axis and substantially symmetrically spaced relative to the intersection of said axes and spaced apart substantially said second distance, a first voltmeter connected responsive to the output of said first pair of pickup units, a second voltmeter connected responsive to the output of said second pair of pickup units, said variable calibration voltages on said electrodes establishing through the terrain a measurable effect on said voltmeters by modulation of the D.C. value of the telluric currents, whereby the amplitude of said calibration voltages received at said voltmeters affords continuous calibration for the current measurements received on said voltmeters, and whereby the relative amplitudes of the voltages on said first and second voltmeters establish the azimuthal direction of the telluric current flow by the phase amplitude relation, third and fourth pairs of electrical conductor pickup units adapted to be placed close to and insulated from the surface of the earth along third and fourth axes, respectively, said third and fourth axes intersecting at a second angle substantially the same as said first angle, a load connected to said third and fourth pickup units, and means to control the gain on the loads connected to said third and fourth pickup units from the voltage obtained from said first and second pickup units, respectively.

19. A ground surface electrical pickup comprising, in combination, four conductive mat elements insulated from ground and spaced closely to the ground, means to connect said mat elements in quadrature, a first set of four electrodes connected to ground and positioned in the same quadrature arrangement but spaced more closely together than said mat elements, a second set of four electrodes connected to ground and positioned in the same quadrature arrangement but spaced apart a greater distance than said mat elements, means to supply a signal to said first set of electrodes, load means connected to obtain an input signal from said electrical pickup mat elements including energy through the terrain from said signal, and means to obtain a resultant output from said load means and connected to said second set of electrodes.

20. A system for measuring currents proportional to the telluric currents in the earth comprising, in combination, four conductive mat elements insulated from ground and spaced closely to the ground, means including amplifier means to connect said mat elements in quadrature, an oscilloscope having two beam deflection means, means including goniometer means to connect the output of said amplifier means to said oscilloscope beam deflection means, means including said goniometer means to impress on said oscilloscope beam deflection means a voltage dependent upon the telluric currents and in a circular sweep pattern dependent upon the sweep frequency of said goniometer to obtain an indication of azimuthal direction on said oscilloscope of any telluric current disturbance.

References Cited

UNITED STATES PATENTS

| | | | |
|---|---|---|---|
| 1,808,397 | 6/1931 | Billotte et al. | 324—1 |
| 1,897,688 | 2/1933 | Ambronn | 324—1 |
| 2,291,596 | 7/1942 | White | 324—1 |
| 2,304,739 | 12/1942 | Minton | 324—1 |
| 2,344,672 | 3/1944 | Blasier | 324—72 |
| 2,352,411 | 6/1944 | Sandretto | 317—2 |
| 2,585,907 | 2/1952 | Barret | 325—28 |
| 2,784,370 | 3/1957 | Morrison | 324—1 X |
| 2,885,633 | 5/1959 | Cook | 324—1 |
| 3,060,372 | 10/1962 | Cagniard | 324—1 |

RUDOLPH V. ROLINEC, *Primary Examiner.*

JAMES W. LAWRENCE, WALTER L. CARLSON, *Examiners.*

G. R. STRECKER, *Assistant Examiner.*